United States Patent
Good et al.

(10) Patent No.: US 8,180,471 B2
(45) Date of Patent: May 15, 2012

(54) TUNING A PROCESS CONTROLLER BASED ON A DYNAMIC SAMPLING RATE

(75) Inventors: Richard P. Good, Austin, TX (US); J. Broc Stirton, Austin, TX (US); Detlef Pabst, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 403 days.

(21) Appl. No.: 12/472,624

(22) Filed: May 27, 2009

(65) Prior Publication Data

US 2010/0305737 A1 Dec. 2, 2010

(51) Int. Cl.
*G06F 19/00* (2011.01)
*G01N 37/00* (2006.01)

(52) U.S. Cl. .............. 700/108; 700/31; 700/37; 700/74; 700/121; 700/174; 702/83

(58) Field of Classification Search .................... 700/31, 700/37, 7, 108–110, 121, 164, 173–176, 700/74; 702/83, 84; 438/14
See application file for complete search history.

(56) References Cited

U.S. PATENT DOCUMENTS

| | | | |
|---|---|---|---|
| 2007/0078556 A1* | 4/2007 | Stirton et al. | 700/108 |
| 2007/0239285 A1* | 10/2007 | Good et al. | 700/1 |
| 2009/0306803 A1* | 12/2009 | Behm et al. | 700/109 |
| 2010/0292824 A1* | 11/2010 | Tsen et al. | 700/105 |

* cited by examiner

*Primary Examiner* — Sean Shechtman
(74) *Attorney, Agent, or Firm* — Williams, Morgan & Amerson, P.C.

(57) ABSTRACT

A method for estimating a state of a process implemented by a tool for fabricating workpieces includes collecting metrology data associated with a subset of workpieces processed in the tool. The collecting exhibits an irregular pattern. Metrology data associated with a selected state observation is received for a selected run of the process. A tuning factor for the selected run is determined based on the irregular pattern. The selected state observation is discounted based on the determined tuning factor. A state estimate of the process is determined based on the discounted selected state observation. At least one process tool operable to implement the process is controlled based on the state estimate.

18 Claims, 3 Drawing Sheets

TUNING A PROCESS CONTROLLER BASED ON A DYNAMIC SAMPLING RATE

CROSS-REFERENCE TO RELATED APPLICATIONS

Not applicable.

BACKGROUND

The present subject matter relates generally to manufacturing and, more particularly, to tuning a process controller based on a dynamic sampling rate.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability. Metrology data collected before, during (i.e., in-situ), or after the processing of a wafer or lot of wafers may be used to generate feedback and/or feedforward information for use in determining a control action for the previous process tool (i.e., feedback), the subsequent process tool (i.e., feedforward), or both.

Run-to-run (RtR) control is commonly used in semiconductor manufacturing to compensate for process disturbances and the therefore regulate processes at a predetermined target. Typically, the controller adjusts an operating recipe for a controlled tool using feedback or feedforward metrology information. Control actions are typically generated using a control model that tracks one or more process state variables associate with the fabrication. For example, a controller may adjust a photolithography recipe parameter to control a critical dimension (CD) of the manufactured devices. Likewise, a controller may control an etch tool to affect a trench depth or a spacer width characteristic.

RtR controllers use historical data to first estimate the state of the process and then calculate the process inputs based on this state estimation. The state is usually assumed to be an integrated moving average (IMA) process, and it is well known that the exponentially weighted moving average (EWMA) filter typically provides the optimal forecast of an IMA process. An RtR controller using the EWMA filter for state estimation is commonly referred to as an EWMA controller.

An EWMA filter uses a weighted average in that the average is more heavily affected by the more recent state values. The EWMA filter is tuned using a tuning factor that regulates how quickly historical data is discounted. If the tuning parameter is close to zero, then the data is discounted very slowly and nearly all available historical data is considered nearly identically when calculating the state of the system. In contrast, when the tuning parameter is close to one, then only the most recent measurements have significant contributions to the state estimate.

Metrology equipment is expensive; hence, there is not sufficient metrology capacity to measure every wafer or lot in the fabrication flow. In addition, measuring wafers is time consuming, which increases cycle time and decreases the throughput of the manufacturing process. Typically, RtR controllers are implemented in conjunction with a sampling application. The tuning parameters for the RtR controller are typically determined empirically prior to implementation. The specifying of the tuning parameters involves various assumptions, including the expected sampling rate of the process. However, this assumption regarding sampling rate can be faulty, resulting in a poorly tuned controller. Moreover, the metrology capacity of the facility may change due to different sampling priorities, equipment maintenance, etc. These changes in sampling capacity affect the achievable sampling rate. Such changes can also result in the controller being poorly tuned, and, as a result, suboptimal.

This section of this document is intended to introduce various aspects of art that may be related to various aspects of the present subject matter described and/or claimed below. This section provides background information to facilitate a better understanding of the various aspects of the subject matter. It should be understood that the statements in this section of this document are to be read in this light, and not as admissions of prior art. The present subject matter is directed to overcoming, or at least reducing the effects of, one or more of the problems set forth above.

BRIEF SUMMARY

The following presents a simplified summary of the present subject matter in order to provide a basic understanding of some aspects of the subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the present subject matter is seen in a method for estimating a state of a process implemented by a tool for fabricating workpieces. The method includes collecting metrology data associated with a subset of workpieces processed in the tool. The collecting exhibits an irregular pattern. Metrology data associated with a selected state observation is received for a selected run of the process. A tuning factor for the selected run is determined based on the irregular pattern. The selected state observation is discounted based on the determined tuning factor. A state estimate of the process is determined based on the discounted selected state observation. At least one process tool operable to implement the process is controlled based on the state estimate.

Another aspect of the present subject matter is seen in a system including a process tool, a metrology tool, a tuning unit, and a process controller. The process tool is operable to fabricate workpieces in accordance with a process. The metrology tool is operable to collect metrology data associated with a subset of workpieces processed in the process tool, the collecting exhibiting an irregular pattern. The tuning unit is operable to receive metrology data associated with a selected state observation for a selected run of the process and determine a tuning factor for the selected run based on the irregular pattern. The process controller is operable to discount the selected state observation based on the determined tuning factor, generate a state estimate of the process based on the discounted selected state observation, and control the process tool based on the state estimate.

BRIEF DESCRIPTION OF THE SEVERAL VIEWS OF THE DRAWINGS

The present subject matter will hereafter be described with reference to the accompanying drawings, wherein like reference numerals denote like elements, and.

While the present subject matter is susceptible to various modifications and alternative forms, specific embodiments thereof have been shown by way of example in the drawings and are herein described in detail. It should be understood, however, that the description herein of specific embodiments is not intended to limit the subject matter to the particular forms disclosed, but on the contrary, the intention is to cover all modifications, equivalents, and alternatives falling within the spirit and scope of the subject matter as defined by the appended claims.

DETAILED DESCRIPTION

One or more specific embodiments of the present subject matter will be described below. It is specifically intended that the present subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present subject matter unless explicitly indicated as being "critical" or "essential."

The present subject matter will now be described with reference to the attached figures. Various structures, systems and devices are schematically depicted in the drawings for purposes of explanation only and so as to not obscure the present subject matter with details that are well known to those skilled in the art. Nevertheless, the attached drawings are included to describe and explain illustrative examples of the present subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
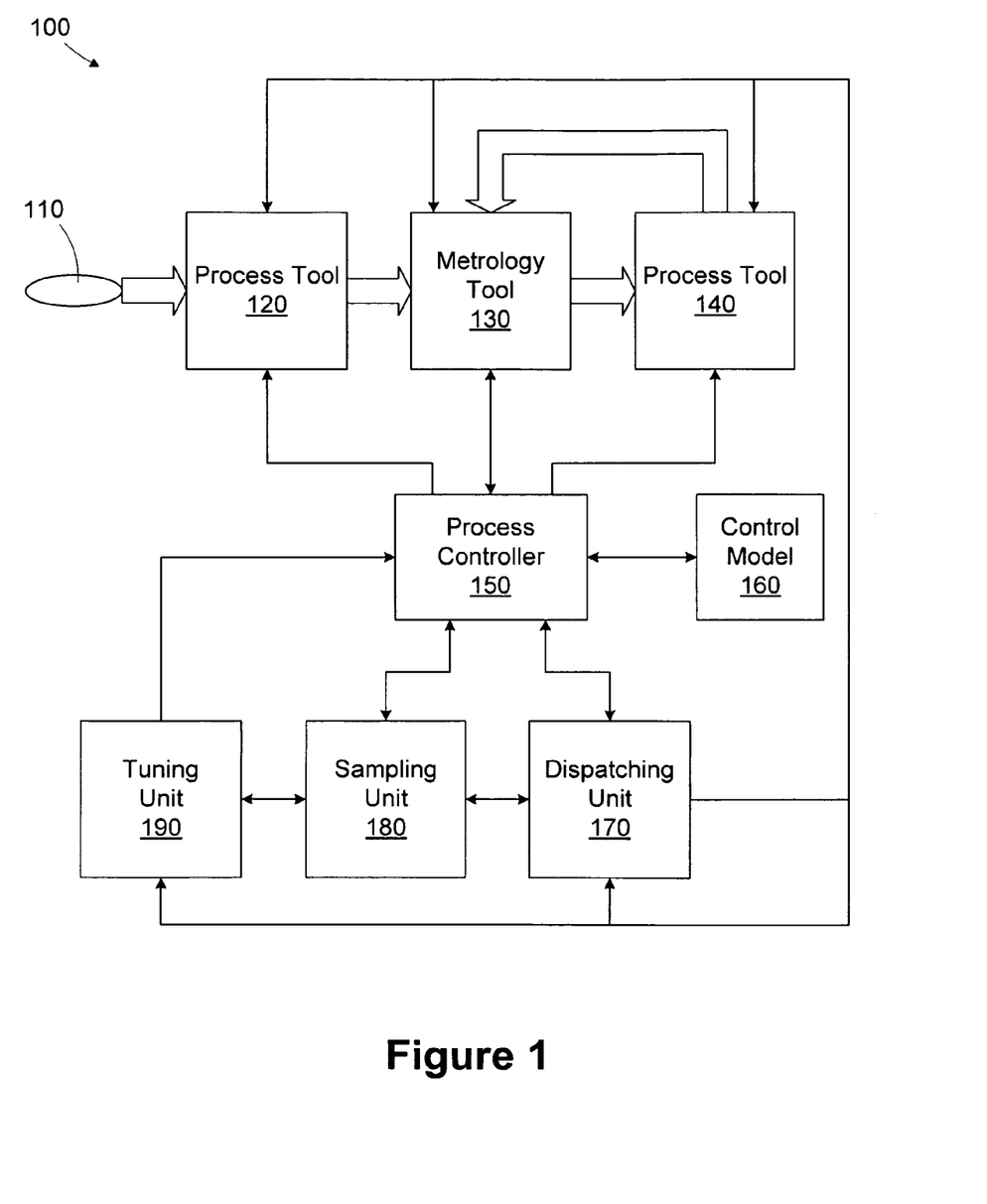
FIG. 1 is a simplified block diagram of a processing line in accordance with one illustrative embodiment of the present subject matter.

Referring now to the drawings wherein like reference numbers correspond to similar components throughout the several views and, specifically, referring to FIG. 1, the present subject matter shall be described in the context of an illustrative processing line 100 for processing wafers 110 in accordance with the present subject matter. The processing line 100 represents a subset of a full processing line for fabricating workpieces, such as semiconductor substrates. The illustrated portion of the processing line 100 includes a first process tool 120, a metrology tool 130, a second process tool 140, and a process controller 150. Of course, separate process controllers 150 may be provided for each tool 120, 140. Also, a full processing line 100 would include numerous tools 120, 130, 140 and multiple instances of each type of tool.

The high level operation of the processing line 100 is controlled by a dispatching unit 170 and a sampling unit 180. In general, the dispatching unit 170 controls the flow of wafers 110 through the various tools 120, 130, 140 by dispatching wafers requiring various operations to tools 120, 130, 140 capable of performing the operation. In response to dispatching commands, transport carriers may be sent to move lots of wafers to the various entities of the processing line 100. The sampling unit 180 determines which wafers 110 are selected for metrology. The sampling unit 180 may employ various rules for making sampling decisions. The sampling rules attempt to provide coverage for various process control, fault detection purposes, and engineering purposes. Typically, due to limited metrology capacity, not all sampling rules can be satisfied for every run. Hence, the sampling unit 180 may employ weighted rules and/or track penalties for missed rules to provide eventual satisfaction of the rules. Due to the limited metrology capacity and the various sampling rules, the sampling pattern, and thus the pattern of wafers being selected for metrology is irregular.

The process controller 150 receives data from the metrology tool 130 and adjusts the operating recipe of one or both of the process tools 120, 140 to reduce variations in the characteristics of the processed wafers 110. The particular control actions taken by the process controller 150 depend on the particular processes performed by the process tools 120, 140, and the output characteristic measured by the metrology tool 130. In the illustrated embodiment, the process controller 150 employs an exponentially weighted filtering technique for estimating process states associated with the wafers 110. Generally, metrology data collected by the metrology tool 130 provides information for adjusting an estimated state of the process employed by the process controller 150. The estimated state is used by the process controller 150 for adjusting the operating recipe of the controlled tool 120, 140.

Typically, the optimal tuning parameter for a model used by the process controller 150, such as an exponentially weighted moving average (EWMA) filter, is a function of sampling rate. Because the metrology sampling rate evident in the processing line 100 is irregular, the model used by the process controller 150 may not be optimally tuned. To account for the irregular nature of the sampling rate, a tuning unit 190 is provided to dynamically adjust the tuning factor employed by the process controller 150. Although the tuning unit 190 is illustrated as being a separate entity, it may be integrated with other entities, such as the process controller 150, the dispatching unit 170, and/or the sampling unit 180, as is described in greater detail below.

Although the present subject matter is described as it may be implemented in a semiconductor fabrication facility, the subject matter is not so limited and may be applied to other manufacturing environments, and essentially any EWMA application. The techniques described herein may be applied to a variety of workpieces including, but not limited to microprocessors, memory devices, digital signal processors, application specific integrated circuits (ASICs), or other similar devices. The techniques may also be applied to workpieces other than semiconductor devices.

The process controller 150 may use a control model 160 of the process tool 120, 140 being controlled to generate control actions. The control model 160 may be developed empirically using commonly known linear or non-linear techniques. The control model 160 may be a relatively simple equation based model, such as an EWMA, or a more complex model, such as a neural network model, principal component analysis (PCA) model, partial least squares/projection to latent structures (PLS) model. The specific implementation of the control model 160 may vary depending on the modeling technique selected and the process being controlled. Using the control model 160, the process controller 150 may determine operating recipe parameters to reduce variation in the characteristics of the wafers 110 being processed.

In the illustrated embodiment, the process controller 150 is a computer programmed with software to implement the functions described. However, as will be appreciated by those of ordinary skill in the art, a hardware controller designed to implement the particular functions may also be used. Moreover, the functions performed by the process controller 150, as described herein, may be performed by multiple controller devices distributed throughout a system. Additionally, the process controller 150 may be a stand-alone controller, it may be resident on the process tool 120, 140, or it may be part of a system controlling operations in an integrated circuit manufacturing facility.

Portions of the subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Generally, the process controller 150 employs a process model. An exemplary simple linear model can be represented such that the process output, y, is the linear combination of the process inputs, u, and a disturbance, v, $$y_t = \beta u_t + v_t \qquad (1)$$

where $\beta$ is the gain between the manipulated variable and the measured output.

An EWMA filter is commonly used for state estimation of run-to-run controllers in semiconductor manufacturing. It is widely known that the EWMA filter $$\hat{y}_{t+1} = \lambda y_t + (1-\lambda)\hat{y}_t \qquad (2)$$

provides the minimum mean square error (MSE) forecast for processes that follow an integrated moving average (IMA) process of the form $$y_{t+1} = y_t - (1-\lambda)a_t + a_{t+1} \quad (3)$$

where $\{a_t; t=0, 1, 2 \ldots\}$ are random shocks from a white noise process and where $0 \leq \lambda < 1$ is the EWMA tuning parameter. The forecast, however, is optimal if and only if every output of the IMA process is measured. If an EWMA controller is integrated with a dynamic sampling application, it is then necessary to retune the controller to maintain optimal performance.

If a sampling scheme is used such that the observations are made at fixed intervals (i.e., as is not the case in the processing line 100), then the resulting process also follows an IMA time series. This implies that the controller only needs to be retuned to compensate for the new sampling rate. If an EWMA controller is well tuned with a steady state sampling interval, S, the EWMA tuning parameter becomes $$\lambda^* = \frac{\sqrt{S\lambda^2(S\lambda^2 - 4\lambda + 4)} - S\lambda^2}{2(1-\lambda)}, \quad (4)$$

where $\lambda$ is the baseline EWMA tuning parameter for the process. When controlling a sampled process, the EWMA controller needs to be more aggressive. If, for example, the controller has an optimal tuning factor of $\lambda=0.3$ at 100% sampling (i.e., the baseline tuning parameter), then, at 50% sampling the optimal EWMA tuning increases to $\lambda=0.4$. Then, by further dropping the sampling rate to 10%, the EWMA tuning becomes $\lambda=0.66$.

As described above, in a semiconductor fabrication environment, the sampling rate is not steady state, but instead irregular. Lots are sampled or skipped by the sampling unit 180 in irregular patterns. Hence, the sampling rate may change continuously over small time increments. Effectively, the sampling rate changes every time a sampling decision to measure or skip a particular lot is made. Because of the complex interacting selection criteria that cause sampling to be highly irregular, sampling patterns are rarely seen in which the observations are made at fixed intervals. It follows that it is inappropriate to use the steady-state solution in (4) for forecasting a sampled system.

To account for sampling irregularities, a maximum likelihood IMA forecast is used to dynamically tune the EWMA controller using an EWMA estimate equation that includes a time varying tuning factor:

$$\hat{y}_t = (1 - \lambda_t^*)\hat{y}_{t-1} + \lambda_t^* y_t \quad (5)$$

where $$\lambda_t^* = \frac{S_t\lambda^2 + \lambda_{t-1}^*(1-\lambda)}{S_t\lambda^2 + (1 + \lambda_{t-1}^*)(1-\lambda)}. \quad (6)$$

Without sampling, $\lambda^*$ can be updated directly after updating the disturbance estimate. However, with a sampled process, it is typically not known how many runs will be skipped before the next measurement is available. When implementing the sampling compensation algorithm in (6), the number of process runs between measurements is counted, and $\lambda_t^*$ is updated right before the disturbance estimate is updated.

Figure 2:
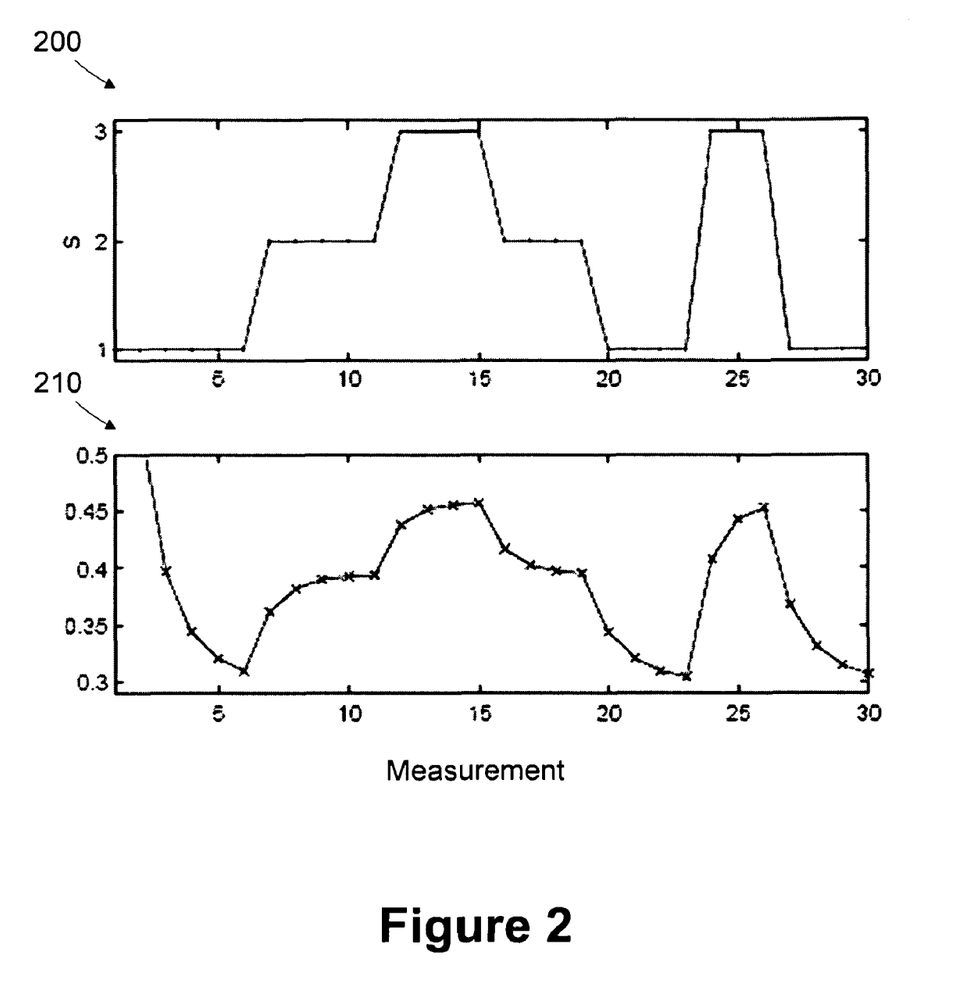
FIG. 2 is a diagram illustrating changes in sampling rate over time.

An illustrative example of the sampling compensation algorithm is shown in FIG. 2. The tuning unit 190 employs a sampling rate at a particular time instant for updating the tuning factor in accordance with (6). The tuning unit 190 may communicate with the tools 120, 130, 140, the process controller 150, the dispatching unit 170, or the sampling unit 180 to determine the sampling rate as a function of time. Typically, time in the processing line 100 may be expressed by run. Sequential runs of a tool 120, 140 are ordered in a temporal fashion, but the time interval between runs may vary. Nonetheless, process run is a function of time. For a metrology operation, the measurement is typically associated with the run of the process tool 120, 140 that processed the wafer 110 immediately prior to the measurement. Hence, the run associated with the metrology data is not related to the time that the metrology tool 130 collected the data, but rather, to the time that the wafer 110 was preciously processed in the process tool 120, 140.

An exemplary sampling interval is shown in curve 200, and the resulting dynamic tuning factor determined by the tuning unit 190 in accordance with (4) is shown in curve 210. The example uses an underlying baseline process tuning factor of $\lambda=0.3$ with varying sampling intervals. Those of ordinary skill in the art are familiar with techniques for determining the baseline tuning factor for a process. For example, historical process data may be used to analyze the process and determine the baseline tuning factor.

The process starts with 100% sampling (i.e., S=1). During this time the tuning unit 190 interfaces with the process controller 150 and the filter is initialized and rapidly approaches the steady state value of $\lambda=0.3$. After the eighth measurement, the sampling application measures only every-other run so S=2 for a short period. During this time, the tuning unit 190 increase $\lambda^*$ used by the process controller 150 thus placing more weight on the most recent measurement. After a few runs $\lambda^*$ reaches a steady state value. The sampling rate is then further decreased before the 12th run and the tuning unit 190 responds accordingly. The tuning unit 190 increases the EWMA constant in response to increases in the sampling interval.

A second example is shown in Table 1 where, again, the baseline tuning factor is $\lambda=0.3$. In this example, the first measurement is given a weight of 1.0. Then two runs are skipped (so that the sampling interval is S=3) and the weight determined by the tuning unit 190 on the following measurement is $\lambda^*=0.581$. One run is then skipped and the EWMA weight is updated to $\lambda^*=0.456$.

An example of the sampling compensation algorithm where the EWMA forgetting factor is updated according to the sampling interval, S is now discussed. The example uses a baseline tuning factor of $\lambda=0.3$.

TABLE 1

| Run | S | $\lambda_t^*$ |
|---|---|---|
| 1 | 1 | 1.00 |
| 2 | 3 | 0.581 |
| 3 | 2 | 0.456 |
| 4 | 1 | 0.369 |
| 5 | 4 | 0.469 |

Implementing the sampling compensation algorithm in (4) may be difficult if the sampling interval is unknown when the disturbance estimate is updated at the metrology step. As such, two other exemplary approaches for implementing the sampling compensation algorithm are discussed that allow for more seamless integration with existing advanced process control systems or sampling applications.

In a first example, the compensated EWMA forgetting factor is updated by the tuning unit 190 by interfacing with the sampling unit 180. The functions described for the tuning unit 190 may be integrated into the sampling unit 180. In this scenario two cases are considered: when the sampling unit 180 has flagged a run for measurement and when the run is flagged for skipping. Start with (6) with an arbitrary sampling interval S.

Now consider the case where one additional run has been skipped $$\lambda_{t+1}^* = \frac{(S_t+1)\lambda^2 + \lambda_{t-1}^*(1-\lambda)}{(S_t+1)\lambda^2 + (1+\lambda_{t-1}^*)(1-\lambda)}. \quad (7)$$

Solving (7) for $\lambda_{t-1}^*$ yields $$\lambda_{t-1}^* = \frac{\lambda_t^*(S\lambda^2 - \lambda + 1) - S\lambda^2}{(1-\lambda) - (1-\lambda_t^*)(1-\lambda)}. \quad (8)$$

Substituting (7) into (8) eliminates both S and $\lambda_{t-1}^*$ $$\lambda_{t+1}^* = \frac{\lambda^2(1-\lambda_t^*) + \lambda_t^*(1-\lambda)}{\lambda^2(1-\lambda_t^*) + (1-\lambda)}. \quad (9)$$

Whenever a run is flagged for measurement, the sampling interval is reset to S=1 such that $$\lambda_{t+1}^* = \frac{\lambda^2 + \lambda_t^*(1-\lambda)}{\lambda^2 + (1+\lambda_t^*)(1-\lambda)}. \quad (10)$$

An example of this implementation scheme is shown in Table 2. Here it is seen that the first measurement has a weight of $\lambda^*=1.0$ meaning that the disturbance estimate is equivalent to the one measurement. The following two measurements are skipped, and during this time $\lambda^*$ becomes more aggressive. On the other hand, when the fourth run is measured, $\lambda^*$ is reduced. Generally speaking, skipping lots causes the EWMA filter to be more aggressive and measuring lots makes the filter less aggressive. It can also be seen that $\lambda^*$ prior to the five measured lots (shown in bold-face in the table) are identical to the five $\lambda^*$s shown in Table 1.

TABLE 2

| Run | Measure | $\lambda_t^*$ | $\lambda_{t+1}^*$ |
| --- | --- | --- | --- |
| 1 | Yes | 1.00 | 0.530 |
| 2 | No | 0.530 | 0.557 |
| 3 | No | 0.557 | 0.581 |
| 4 | Yes | 0.581 | 0.415 |
| 5 | No | 0.415 | 0.456 |
| 6 | Yes | 0.456 | 0.369 |
| 7 | Yes | 0.369 | 0.332 |
| 8 | No | 0.332 | 0.385 |
| 9 | No | 0.385 | 0.430 |
| 10 | No | 0.430 | 0.469 |
| 11 | Yes | 0.469 | 0.374 |

If integration with a sampling unit 180 is not implemented, then the sampling compensation algorithm can be implemented by the tuning unit 190 by updating the EWMA filter at the process and metrology steps. In such a case, the tuning unit 190 may interface with or may be integrated with the dispatching unit 170. Alternatively, the tuning unit 190 may directly interface with the tools 120, 130, 140 to monitor events and identify when runs are processed and when runs are measured. When a run is at the process step (e.g., the process tool 120 or 140) then the sampling interval is increased by one run and the result is the same as (9). However, when a lot is measured by the metrology tool 130, then there is no sampling interval involved, that is S=0, and $$\lambda_{t+1}^* = \frac{\lambda_t^*(1-\lambda)}{(1+\lambda_t^*)(1-\lambda)}. \quad (11)$$

When the tuning unit 190 is integrated with the sampling unit 180 then one process step is assumed whenever a lot is flagged for metrology. When the EWMA filter is updated separately at metrology and the process steps, then the process step has already occurred by the time the lot is measured. If the sampling interval is anything other than S=0 then one would be effectively processing the lot twice. Table 3 shows an example of this implementation scheme.

Table 3 shows the same events as Table 2 where the events are divided into metrology (M) and process (P) operations. It is apparent in Table 3 that the first event is a process step directly followed by a metrology event. These two operations are captured by the first line of Table 2. Next, three process events are followed by a metrology event in Run 6. This indicates that two process events are skipped followed by a process event that is measured. Again, this is identical to Table 2 where two runs are skipped followed by a measured process step. It is worth noting that the EWMA weightings associated with the metrology events (shown in bold-face) are identical in Tables 1, 2, and 3.

TABLE 3

| Event | Operation | $\lambda_t^*$ | $\lambda_{t+1}^*$ |
| --- | --- | --- | --- |
| 1 | P | 1.00 | 1.00 |
| 2 | M | 1.00 | 0.500 |
| 3 | P | 0.500 | 0.530 |
| 4 | P | 0.530 | 0.557 |
| 5 | P | 0.557 | 0.581 |
| 6 | M | 0.581 | 0.367 |
| 7 | P | 0.367 | 0.415 |
| 8 | P | 0.415 | 0.456 |
| 9 | M | 0.456 | 0.313 |
| 10 | P | 0.313 | 0.369 |
| 11 | M | 0.369 | 0.269 |
| 12 | P | 0.269 | 0.332 |
| 13 | P | 0.332 | 0.385 |
| 14 | P | 0.385 | 0.430 |
| 15 | P | 0.430 | 0.469 |
| 16 | M | 0.469 | 0.319 |

Three techniques have been illustrated for implementing the technique in a manufacturing environment, all of which return identical predictions of the disturbance state.

- If the sampling interval is known then the EWMA tuning parameter can be estimated directly before measurement.
- If the sampling application is integrated with the APC systems infrastructure, then the EWMA tuning parameter can be updated by the sampling unit 180.
- The EWMA tuning parameter can be updated at the process and metrology steps by interfacing with the tools 120, 130, 140 or the dispatching unit 170.

Dynamically updating the tuning factor based on the irregular metrology pattern increases the efficacy of the process controller 150 by providing a better state estimate. Increased controller performance relates generally to increased device performance and profitability.

Figure 3:
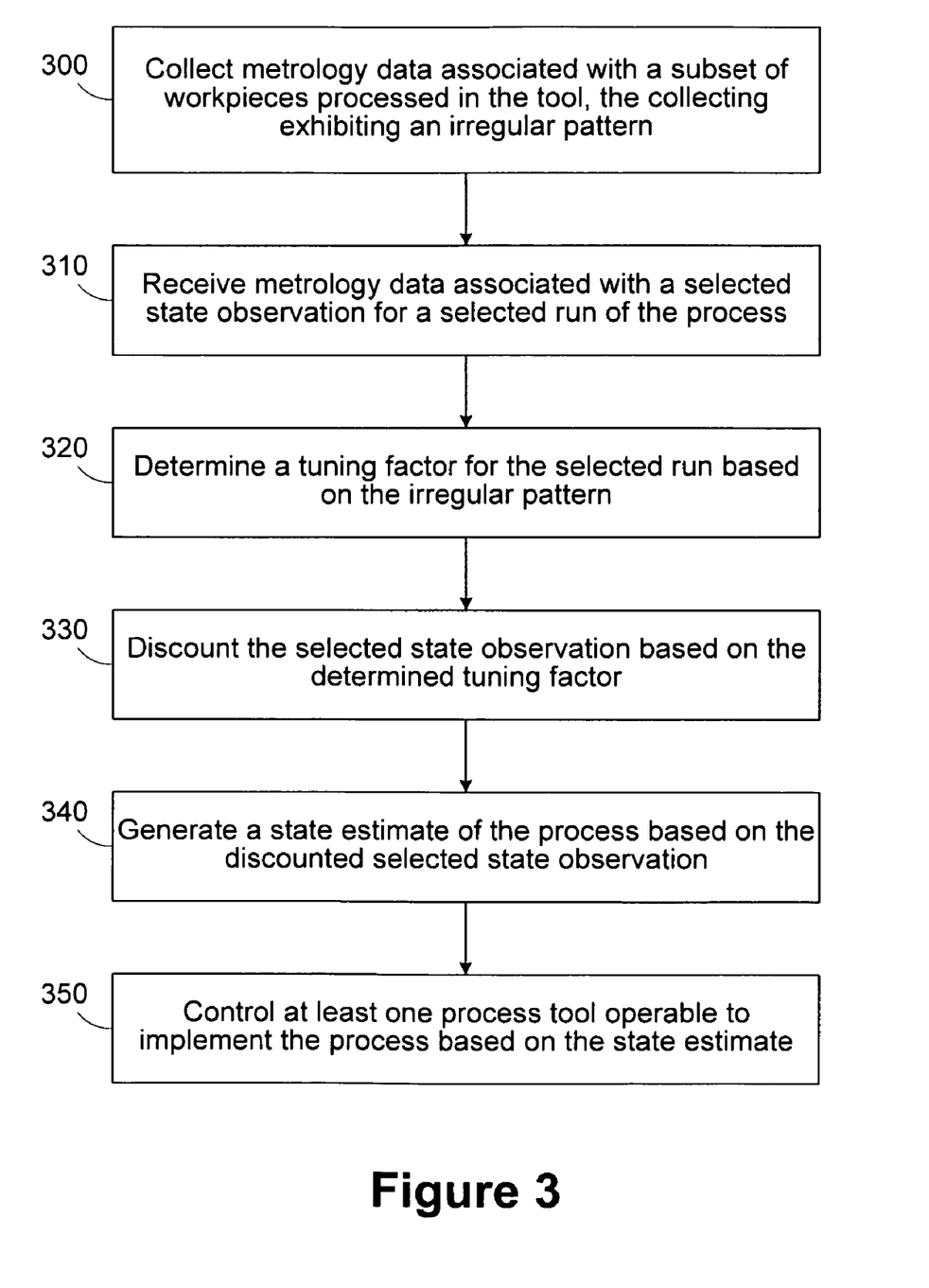
FIG. 3 is a simplified flow diagram of a method for estimating a state of a process implemented by a tool for fabricating workpieces in accordance with another illustrative embodiment of the present subject matter.

Turning now to FIG. 3, a simplified flow diagram of a method for estimating a state of a process implemented by a tool for fabricating workpieces in accordance with another illustrative embodiment of the present subject matter is shown. In method block 300, metrology data associated with a subset of workpieces processed in the tool is collected. The collecting exhibits an irregular pattern. In method block 310, metrology data associated with a selected state observation for a selected run of the process is received. In method block 320, a tuning factor for the selected run is determined based on the irregular pattern. In method block 330, the selected state observation is discounted based on the determined tuning factor. In method block 340, a state estimate of the process is generated based on the discounted selected state observation. In method block 350, at least one process tool operable to implement the process is controlled based on the state estimate.

The particular embodiments disclosed above are illustrative only, as the subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the subject matter. Accordingly, the protection sought herein is as set forth in the claims below.

We claim:

1. A method for estimating a state of a process implemented by a tool for fabricating workpieces, comprising:
   collecting metrology data associated with a subset of workpieces processed in the tool, the collecting exhibiting an irregular pattern;
   receiving metrology data associated with a selected state observation for a selected run of the process;
   determining a tuning factor for the selected run based on the irregular pattern, wherein determining the tuning factor comprises determining the tuning factor for the selected run as a function of a baseline tuning factor of the process and a tuning factor associated with a previous run of the process;
   discounting the selected state observation based on the determined tuning factor;
   generating a state estimate of the process based on the discounted selected state observation;
   controlling at least one process tool operable to implement the process based on the state estimate; and
   updating the tuning factor for a subsequent run of the process using the equation:

$$\lambda_{t+1}^* = \frac{\lambda^2 + \lambda_t^*(1-\lambda)}{\lambda^2 + (1+\lambda_t^*)(1-\lambda)},$$

where $\lambda_{t+1}^*$ is the updated tuning factor for the subsequent run, $\lambda_t^*$ is the tuning factor at the selected run, and $\lambda$ is the baseline tuning factor of the process.

2. The method of claim 1, further comprising determining a sampling rate as a function of process run based on the irregular pattern, wherein determining the tuning factor further comprising comprises determining the tuning factor based on the sampling rate at the selected run.

3. The method of claim 2, wherein determining the tuning factor comprises determining the tuning factor using the equation $$\lambda_t^* = \frac{S_t\lambda^2 + \lambda_{t-1}^*(1-\lambda)}{S_t\lambda^2 + (1+\lambda_{t-1}^*)(1-\lambda)}$$

where $\lambda_t^*$ is the tuning factor for the selected run, $S_t$ is the sampling rate at the selected run, $\lambda_{t-1}^*$ is the tuning factor at the previous run, and $\lambda$ is the baseline tuning factor of the process.

4. The method of claim 1, wherein updating the tuning factor comprises updating the tuning factor responsive to skipping a workpiece processed in a subsequent run for metrology.

5. The method of claim 1, further comprising further updating the tuning factor responsive to selecting a workpiece processed in a second subsequent run for metrology.

6. The method of claim 5, wherein updating the tuning factor comprises updating the tuning factor using the equation $$\lambda_{t+1}^* = \frac{\lambda^2 + \lambda_t^*(1-\lambda)}{\lambda^2 + (1+\lambda_t^*)(1-\lambda)}$$

where $\lambda_{t+1}^*$ is the updated tuning factor for the second subsequent run, $\lambda_t^*$ is the tuning factor at a run prior to the second subsequent run, and $\lambda$ is the baseline tuning factor of the process.

7. The method of claim 1, wherein updating the tuning factor comprises updating the tuning factor responsive to a subsequent run of the process in the process tool.

8. The method of claim 7, further comprising:
   further updating the tuning factor responsive to measuring a workpiece associated with the subsequent run in a metrology tool; and
   updating the state estimate based on the further updated tuning factor and a state observation associated with the subsequent run generated by the metrology tool.

9. The method of claim 8, wherein further updating the tuning factor comprises further updating the tuning factor using the equation $$\lambda_{t+1}^* = \frac{\lambda_t^*(1-\lambda)}{(1+\lambda_t^*)(1-\lambda)}$$

where $\lambda_{t+1}^*$ is the further updated tuning factor associated with the measuring of the workpiece, $\lambda_t^*$ is the updated tuning factor, and $\lambda$ is the baseline tuning factor of the process.

10. The method of claim 1, wherein determining the tuning factor based on the irregular pattern further comprises:
    determining a sampling rate as a function of process run based on the irregular pattern; and
    determining the tuning factor based on the sampling rate at the selected run.

11. The method of claim 1, wherein determining the tuning factor based on the irregular pattern further comprises:
    designating on a run by run basis whether a particular workpiece is selected for metrology or skipped for metrology; and determining the tuning factor based on the pattern of selections and skips.

12. The method of claim 1, wherein determining the tuning factor based on the irregular pattern further comprises determining the tuning factor based on a pattern of workpieces processed in the tool and workpieces subjected to metrology.

13. A system, comprising:
- a process tool operable to fabricate workpieces in accordance with a process;
- a metrology tool operable to collect metrology data associated with a subset of workpieces processed in the process tool, the collecting exhibiting an irregular pattern;
- a tuning unit operable to receive metrology data associated with a selected state observation for a selected run of the process and determine a tuning factor for the selected run based on the irregular pattern, wherein the tuning factor for the selected run is a function of a baseline tuning factor of the process and a tuning factor associated with a previous run of the process; and
- a process controller operable to discount the selected state observation based on the determined tuning factor, generate a state estimate of the process based on the discounted selected state observation, and control the process tool based on the state estimate;
- wherein the tuning unit is further adapted to update the tuning factor for a subsequent run of the process using the equation:

$$\lambda_{t+1}^* = \frac{\lambda^2 + \lambda_t^*(1-\lambda)}{\lambda^2 + (1+\lambda_t^*)(1-\lambda)},$$

where $\lambda_{t+1}^*$ is the updated tuning factor for the subsequent run, $\lambda_t^*$ is the tuning factor at the selected run, and $\lambda$ is the baseline tuning factor of the process.

14. The system of claim 13, wherein the tuning unit is operable to determine a sampling rate as a function of process run based on the irregular pattern and determine the tuning factor based on the sampling rate at the selected run.

15. The system of claim 13, further comprising a sampling unit operable to select particular workpieces processed by the process tool for measuring in the metrology tool and skip other workpieces, wherein the tuning unit is operable to determine the tuning factor based on a pattern of the selections and skips.

16. The system of claim 13, wherein the tuning unit is further operable to determining determine the tuning factor based on a pattern of workpieces processed in the tool and workpieces subjected to metrology in the metrology tool.

17. The system of claim 16, further comprising a dispatching unit operable to dispatch a first set of workpieces to the process tool and a subset of the first set of workpieces to the metrology tool, wherein the tuning unit is operable to interface with the dispatching unit to identify the pattern.

18. A system for estimating a state of a process implemented by a tool for fabricating workpieces, comprising:
- means for collecting metrology data associated with a subset of workpieces processed in the tool, the collecting exhibiting an irregular pattern;
- means for receiving metrology data associated with a selected state observation for a selected run of the process;
- means for determining a tuning factor for the selected run based on the irregular pattern;
- means for discounting the selected state observation based on the determined tuning factor;
- means for generating a state estimate of the process based on the discounted selected state observation;
- means for controlling at least one process tool operable to implement the process based on the state estimate; and
- means for updating the tuning factor for a subsequent run of the process using the equation:

$$\lambda_{t+1}^* = \frac{\lambda^2 + \lambda_t^*(1-\lambda)}{\lambda^2 + (1+\lambda_t^*)(1-\lambda)},$$

where $\lambda_{t+1}^*$ is the updated tuning factor for the subsequent run, $\lambda_t^*$ is the tuning factor at the selected run, and $\lambda$ is the baseline tuning factor of the process.

* * * * *